June 23, 1970 — J. R. HINES — 3,517,128
SURGICAL EXPANDING ARM DILATOR
Filed Feb. 8, 1968 — 2 Sheets-Sheet 1

Inventor
James R. Hines
By [signature]
Atty.

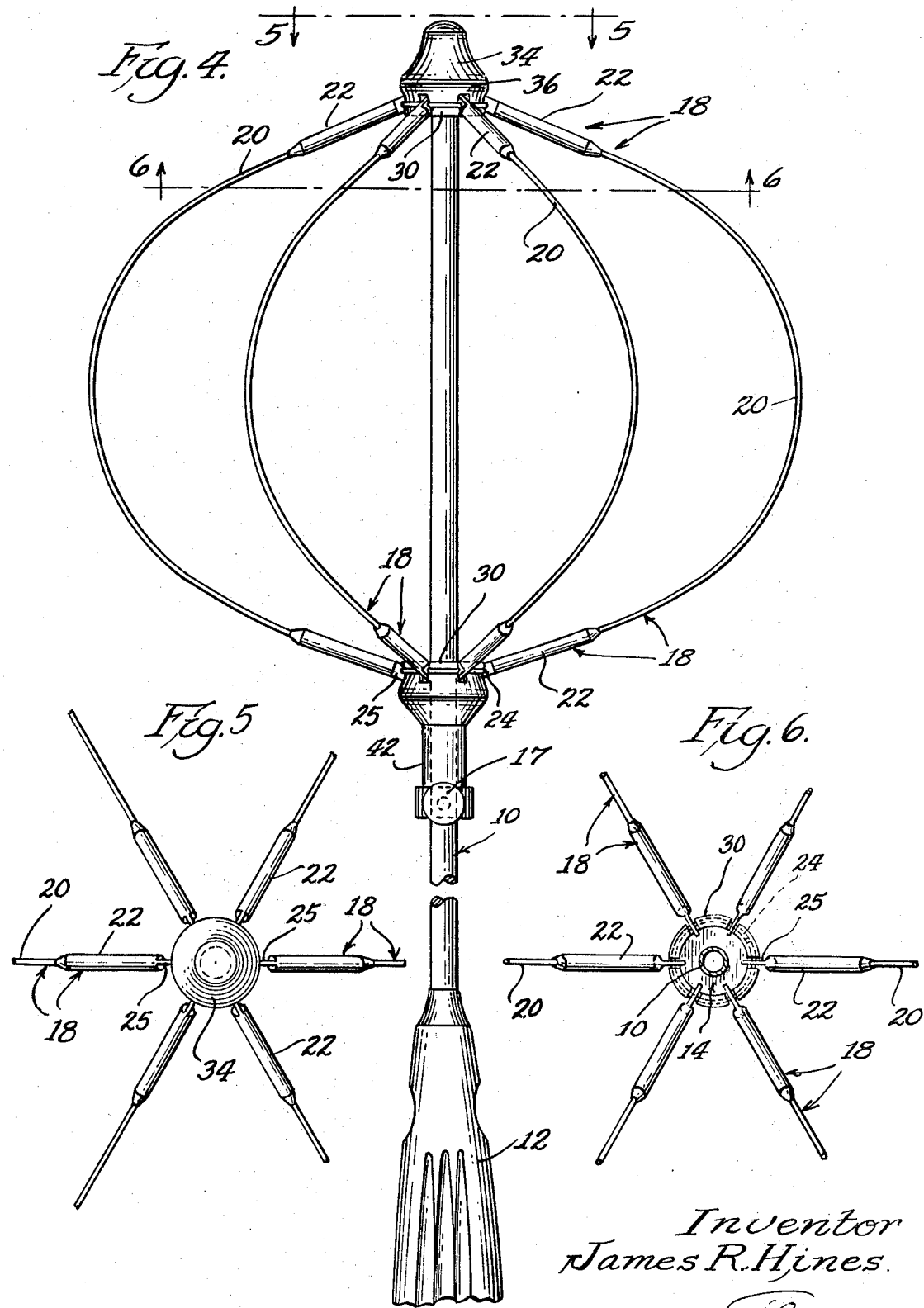

United States Patent Office 3,517,128
Patented June 23, 1970

3,517,128
SURGICAL EXPANDING ARM DILATOR
James R. Hines, 251 E. Chicago Ave.,
Chicago, Ill. 60611
Filed Feb. 8, 1968, Ser. No. 704,003
Int. Cl. A61m 29/00
U.S. Cl. 128—345                                                    4 Claims

ABSTRACT OF THE DISCLOSURE

A surgical dilator in the form of an expansible cage which, in its collapsed condition, consists of a series of substantially parallel closely positioned flexible stainless steel ribs. The distal ends of the ribs are grouped together and hingedly connected to a ring carried on a guide rod, while the proximate ends of the ribs are similarly grouped and connected to a second ring which is slidable on the rod toward and away from the first ring. As the second ring is slid toward the first ring, the steel ribs become progressively bowed outwardly to form a balloon-like cage structure which expands the surrounding tissue and maintains the body cavity expanded. Means are provided for securing the second ring to the rod at any selected position therealong.

---

The improved surgical dilator comprising the present invention is designed primarily for use as an exploratory instrument by means of which a relatively large organ, such, for example, as the stomach, bladder or colon, may be dilated for examination purposes. The invention is, however, capable of other uses and a surgical dilator embodying the principles of the invention may, by suitable modification if required, be employed in the dilation of other organs regardless of whether the dilation be for examination purposes or for actual surgical treatment of the involved organ while the latter is in its distended or dilated condition. Irrespective, however, of the particular use to which the invention may be put, the essential features thereof remain substantially the same.

There is currently in use a type of surgical dilator which may conveniently be referred to as being of the radially expansible type in that such a dilator embodies a series or group of articulated ribs which normally lie in close proximity to one another and in substantial parallelism. Certain adjacent ends of the ribs are pivoted to a fixed collar on a guide rod while the other adjacent ends are pivoted to a sliding collar, the arrangement being roughly similar to an umbrella rib mounting so that when the sliding collar is slid along the guide rod toward the fixed collar, the articulated ribs become expanded into a cage-like structure for distending the wall of the patient's organ into which the instrument may be inserted. It is to this general type of surgical dilators that the present invention relates.

Heretofore, radially expansible surgical dilators of the type briefly outlined above have not in practice proven altogether satisfactory, particularly where articulated ribs are employed. Uniform expansion of the cage-like structure cannot be attained by the use of articulated ribs regardless of the number of rib sections which may be employed for each rib. For example, where each rib is comprised of only two sections, maximum expansion takes place when these two sections assume right angle positions. Under these conditions, the fully expanded cage is in the form of a rigid two-part tandem pyramid structure where maximum radial expansion takes place at a series of sharp points which lie in a common plane. The presentation of sharp points to the wall of an organ obviously does not follow sound surgical practice and, furthermore, during expansion of the cage-like structure, linear stretching of the cavity of the organ along localized regions is conducive toward the production of lesions by reason of a pronounced tearing action. Still further, the provision of pivoted joints between the adjacent ends of the rib sections necessitates bulbous enlargements at these points and enhances the adherence thereto of tissue and other foreign material, thus rendering the joints difficult to clean.

If the number of rib sections is increased in an effort to attain more uniform expansion of the cage-like structure, the individual ribs become unstable, whereas with only two rib sections per rib, a stable triangle is involved when the sliding collar is locked in position. With three rib sections, for example, an unstable quadrilateral polygon is established where maximum uniformity of expansion can take place only in the event of good frictional engagement of the rib sections by the wall of the organ undergoing dilation. If more than three rib sections are employed per rib, extremely good frictional characteristics must be present in order to assure cage expansion and even after this has been attained, the fully expanded cage-like structure is subject to sudden collapse if such frictional characteristics are not maintained indefinitely. Under such conditions, surgical exploration of the involved organ may dislodge the stable equilibrium of any given rib section with the net result that the entire cage-like structure or any portion thereof will collapse.

The present invention is designed to overcome the above-noted limitations that are attendant upon the construction and use of surgical dilators of the radial expansion type, and toward this end, the invention contemplates the provision of a surgical dilator in which the various expansion ribs of the cage-like structure are non-articulated and are in the form of lengths of flexible resilient stainless steel wire stock, the ribs being thus devoid of intermediate pivoted joints or other obstructions which ordinarily would interfere with proper cage expansion by effecting point-contact with the wall of the organ to which the dilator is applied. The expanding action of these ribs is attained by a flexing of the ribs so that they become progressively bowed in an outward direction, the fully expanded cage-like structure assuming a condition which more closely approaches a sphere than has hitherto been possible with articulated or jointed ribs.

A surgical dilator embodying the principles of the present invention is possessed of numerous additional advantages and principal among them is the fact that by the use of relatively small diameter steel wire (for example, twenty gauge wire) and by limiting the number of ribs to a minimum (for example, six), negligible concealment of tissue for exploratory purposes takes place. The absence of multiple pivoted joints is responsible for numerous advantages including the attainment of arcuate expansion as distinguished from angular expansion; the absence of sharp tissue-penetrating points; the elimination of localized linear stretching of tissue; and a safeguard against inadvertent collapse of the expanded cage-like structure.

The provision of a surgical dilator which is of simplified construction; one which is possessed of a minimum number of parts, particularly moving parts and, therefore, is likely to get out of order; one which is rugged and durable and, therefore, will withstand repeated as well as rough usage; one which is readily susceptible to sterilization, as, for example, in an autoclave; one which is capable of ease of assembly and dismantlement for purposes of inspection, replacement or repair of parts; one which requires no special skill for its proper operation over and above that possessed by the average competent surgeon; one which, when in its collapsed condition, consumes but little space so that it may conveniently be stored; and one which, otherwise, is well adapted to perform the services required of it, are further desirable features which have been borne in mind in the production and development of the present invention.

Numerous other objects and advantages of the invention, not at this time enumerated, will readily suggest themselves as the nature of the invention is better understood.

The invention consists in the several novel features which are hereinafter described and are more particularly defined by claims at the conclusion hereof.

In the accompanying two sheets of drawings forming a part of this specification, one illustrative embodiment of the invention is shown.

In these drawings:

FIG. 4 is a side elevational view showing the improved surgical dilator in its fully extended condition;

FIG. 5 is a fragmentary top plan view of the surgical dilator in its extended or operative position; and FIG. 6 is a horizontal or transverse sectional view taken on the line 6—6 of FIG. 4.

Figure 1:
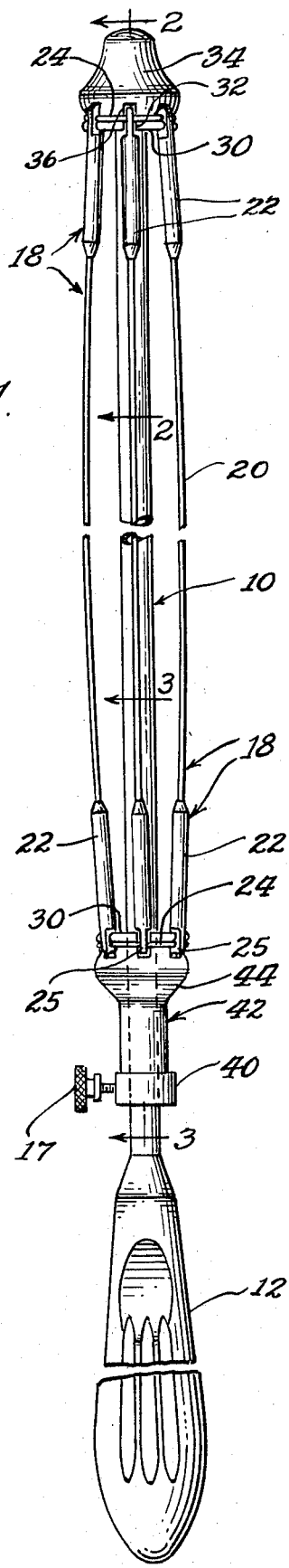
FIG. 1 is a side elevational view of a surgical dilator embodying the present invention and showing the same in its fully collapsed condition.
Figure 2:
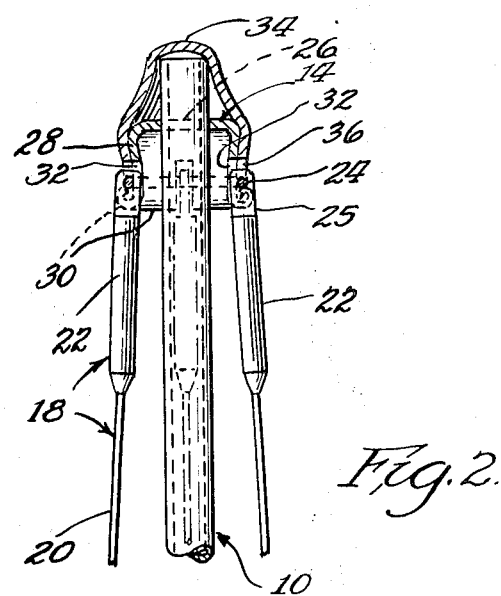
FIG. 2 is an enlarged fragmentary longitudinal sectional view taken substantially along the line 2—2 of FIG. 1.
Figure 3:
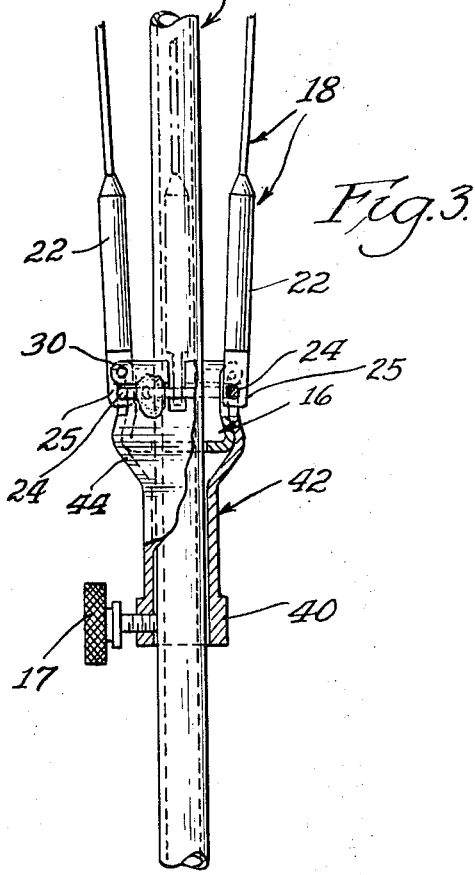
FIG. 3 is an enlarged fragmentary longitudinal sectional view taken substantially along the line 3—3 of FIG. 1.

Referring now to the drawings in detail and in particular to FIGS. 1 and 2 thereof, the surgical dilator of the of the present invention involves in its general organization an umbrella-like assembly of parts including a central axially extending guide rod 10 on one end (hereinafter referred to as the "proximate" end) of which there is disposed a bulbous handle 12, and on the other or distal end of which there is mounted a fixed collar 14. The guide rod 10 is preferably of tubular construction although it may be solid if desired. Slidably disposed on the guide rod 10 and movable toward and away from the fixed collar 14 is a shiftable control collar 16, together with a set screw 17 by means of which said control collar may be secured in any desired position of adjustment along the rod 10. Pivotally connected at their opposite ends to the fixed collar 14 and the shiftable collar 16 are equally and circumferentially spaced composite flexible expansion ribs 18 which, in their free condition, assume slightly radially and outwardly bowed positions on a relatively long radius of curvature (see FIGS. 1 and 2). Preferably, there are six ribs 18, although it is to be understood that in certain instances, depending on the particular use of the dilator, more or less may be employed. The aforementioned parts, in essence, constitute the surgical dilator of the present invention and it will be appreciated that when the shiftable collar 16 is slid along the guide rod 10 toward the fixed collar 14, the central portions of the various expansion ribs 18 will become progressively flexed outwards so as to assume decreasing radii of curvature while at the same time the ribs establish an expanded cage-like structure such as is illustrated in FIG. 4 and which represents the fully extended condition of the surgical dilator.

Considering now the structural details of the present surgical dilator, such details are susceptible to wide modification within the scope of the invention, but in the illustrated form of the invention, each of the flexible expansion ribs 18 is shown as being comprised of an elongated medial section 20 in the form of a length of flexible stainless steel wire stock. The opposite ends of each rib are fixedly anchored in any suitable manner, as, for example, by a crimping operation, in solid cylindrical holders 22 which are in the form of stainless steel rod sections.

The pivotal connection between each expansion rib 18 and the fixed collar 14 is effected by means of a split attachment ring 24 which surrounds the collar 14 and passes through small holes in the flattened outer or distal ends 25 of the adjacent holders 22. The fixed collar 14 is formed of stainless steel and is of relatively deep cup-shaped configuration so as to provide a crown portion 26 (see FIG. 2) from which there depends an inwardly tapered skirt portion 28. The lower rim of the skirt portion of the fixed collar 14 is formed with an outrolled bead 30 and the split pivot ring 24 is confined within the shallow external recess which exists between the crown portion 26 and the bead 30. The bead 30 is provided with an annular series of equidistantly spaced transverse slots 32 in order to accommodate the flattened outer ends 25 of the rod holders 22. A protective cap 34 fits telescopically over the crown portion 26 of the fixed collar 14 and is provided with slots 36 at regions which are in circumferential register with the slots 32 and also serve to receive and accommodate the flattened outer ends 25 of the rod holders 22. The protective cap 34 is, like the collar 14, formed of stainless steel.

The pivotal connections between the proximate ends of the various expansion ribs 18 and the slidable collar 16 are similar to those between the distal ends of the ribs and the fixed collar 14, the two collars being substantially identical in construction. Said pivotal connections between the proximate ends of the ribs 18 and the slidable collar involve a split pivot ring. The latter is of the same construction as the collar 16 and is similarly disposed. Therefore, in order to avoid needless repetition of description, similar reference characters have been applied to the corresponding parts as between the two groups or sets of pivotal connections.

The previously mentioned set screw 17 by means of which the slidable collar 16 may be secured in any desired adjusted position along the guide rod 10 is threadedly received through a radial internally threaded hole in a thickened radial flange 40 on the outer end of a tubular sleeve 42, the sleeve being formed at its inner end with a bowl portion 44 which is telescopically received over the crown portion of the collar 16, the bowl portion being roughly similar to the cap 34 and being provided at its rim portion with equidistantly spaced slots which register with the slots in the bead of the skirt portion of the sleeve 14 and are adapted with the latter slots to receive the flattened outer ends of the adjacent cylindrical holders 22. The sleeve 42 is formed of stainless steel as are all the other elements of the surgical instrument as heretofore indicated.

In the operation of the herein described surgical dilator, after the cage-like structure thereof has been introduced into a body cavity or organ to be dilated, the slidable collar 16 is progressively slid along the guide rod 10 toward the fixed collar 14, thus gradually expanding the cage-like structure in the manner previously described. Since the nature of the pivotal connections between the opposite ends of the expansion ribs 18 and the two collars 14 and 16 is such as to prevent tangential tilting of the ribs with respect to either split attachment ring 24, and since the ribs are initially slightly outwardly bowed, the ribs are thus constrained to flex in a direction to decrease their radii of curvature and there can be no relative circumferential movement of the bowed regions of the ribs. This is conducive toward uniform radial expansion of the wall of the body cavity or organ to be dilated and, in the case of a stomach lining for example, effects unfolding of the redundant folds associated with the collapsed stomach, thereby increasing the area of visualization and rendering localized regions of the linking accessible for surgical or other treatment if desired. The relatively few number of expansion ribs 18 also contributes toward large interior visibility of the body cavity or organ undergoing examination or treatment.

It is to be noted that in connection with the various expansion ribs 18, the more effective expansion medial sections 20 of these ribs are comprised of stainless steel wire lengths which will flex uniformly from end to end, whereas the end regions which are embodied in the rigid solid cylindrical holders 22 are disposed in less strategic positions where only a low expansion factor is required. Due to the increased thickness of these rigid holders, tearing or cutting of the entrance rim region of the body cavity or organ undergoing exploration or treatment is precluded as would be the case if the wire stock sections 20 of the ribs were continued to the pivot regions.

The invention is not to be limited to the exact arrangement of parts shown in the accompanying drawings or described in this specification as various changes in the details of construction may be resorted to without departing from the spirit or scope of the invention. For example, although the various parts of the present dilator have been described herein as being formed of stainless steel, it is within the purview of the invention to form any or all of them of a suitable moldable plastic material. Similarly, whereas in the illustrated form of the invention the various expansion ribs are shown as being pivotally connected to the fixed collar and to the shiftable collar, it is contemplated that under certain circumstances, these ribs may have certain of their ends secured in or formed integrally with the guide rod or shiftable collar, in which case, flexing of the ribs at their regions of juncture would allow for the desired outward bowing of the ribs and consequent expansion of the cage-like structure. Therefore, only insofar as the invention is particularly pointed out in the accompanying claims is the same to be limited.

Having thus described the invention what I claim as new and desire to secure by Letters Patent is:

1. A surgical dilator comprising a guide rod presenting a distal end and a proximate end, a shiftable cup-shaped collar slidable on said guide rod toward and away from said distal end between a retracted position and an advanced position, said collar having a crown portion provided with a central opening through which the guide rod projects, and a skirt portion having a rim defining an annular recess, a pivot ring seated in said recess, a series of expansion ribs disposed in circumferentially spaced relationship around said guide rod, said ribs being in the form of elongated lengths of flexible wire-like stock of stainless steel and having their proximate ends pivoted to said pivot ring and their distal ends pivoted to the distal end of the guide rod, said ribs being of such length that when the shiftable collar is in its retracted position they lie in close coextensive proximity to and substantial parallelism with the guide rod, and when the shiftable collar is in its advanced position the ribs assume an outwardly bowed relationship and present arcuate configurations on the order of 180° to thus form a generally spherical cage-like structure, and means for locking said shiftable collar to said guide rod in any selected longitudinal position therealong between its advanced and retracted positions.

2. A surgical dilator as set forth in claim 1 and wherein the rim region of said apron portion is slitted to afford clearance regions for the pivotally connected ends of the ribs.

3. A surgical dilator as set forth in claim 1 and wherein the pivotal connection between the distal ends of the ribs and the distal end of the guide rod comprises a fixed collar similar to said shiftable collar and similarly disposed on said guide rod, said dilator including a split pivot ring similarly disposed on the fixed collar and similarly connected to the distal ends of the ribs.

4. A surgical dilator as set forth in claim 3, including additionally, a stainless steel cap telescopically received over the distal end of the guide rod as well as the fixed collar, and a tubular sleeve telescopically received over the shiftable collar and through which said guide rod slidably extends, and wherein said means for locking the shiftable collar to the guide rod comprises a set screw projecting through the tubular sleeve and engageable with the guide rod.

References Cited
UNITED STATES PATENTS

| | | | |
|---|---|---|---|
| 827,193 | 7/1906 | Thrash | 128—243 |
| 833,759 | 10/1906 | Sourwine | 128—243 |
| 1,433,031 | 10/1922 | Pegaitaz | 128—345 |
| 1,972,428 | 9/1934 | Richard | 128—243 |
| 2,586,553 | 2/1952 | Moscarello | 128—243 |

DALTON L. TRULUCK, Primary Examiner

U.S. Cl. X.R.

128—243